United States Patent
Thakkar et al.

(10) Patent No.: US 11,397,766 B2
(45) Date of Patent: Jul. 26, 2022

(54) CONSOLIDATION OF RESPONSES FROM QUERIES TO DISPARATE DATA SOURCES

(71) Applicant: GOOGLE LLC, Mountain View, CA (US)

(72) Inventors: Anuj Thakkar, Mountain View, CA (US); Chaitrali Amrutkar, Mountain View, CA (US); Ognjen Nikolic, Mountain View, CA (US); Jason Douglas, Mountain View, CA (US); Ilya Firman, Mountain View, CA (US); Steve Chen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/324,605

(22) PCT Filed: Feb. 6, 2019

(86) PCT No.: PCT/US2019/016917
§ 371 (c)(1),
(2) Date: Feb. 11, 2019

(87) PCT Pub. No.: WO2020/106314
PCT Pub. Date: May 28, 2020

(65) Prior Publication Data
US 2021/0334305 A1 Oct. 28, 2021

Related U.S. Application Data

(60) Provisional application No. 62/770,338, filed on Nov. 21, 2018.

(51) Int. Cl.
*G06F 16/00* (2019.01)
*G06F 16/632* (2019.01)
(Continued)

(52) U.S. Cl.
CPC ............ *G06F 16/634* (2019.01); *G06F 3/165* (2013.01); *G06F 16/9532* (2019.01)

(58) Field of Classification Search
CPC ..... G06F 16/634; G06F 3/165; G06F 16/9532
See application file for complete search history.

(56) References Cited

U.S. PATENT DOCUMENTS

| 2003/0084096 A1* | 5/2003 | Starbuck | G06F 16/958 |
| | | | 707/E17.116 |
| 2003/0145317 A1* | 7/2003 | Chamberlain | G06F 8/61 |
| | | | 717/177 |

(Continued)

FOREIGN PATENT DOCUMENTS

WO 2018204288 11/2018

OTHER PUBLICATIONS

International Search Report and Written Opinion of the International Searching Authority on PCT Appl. Ser. No. PCT/US2019/016917 dated Apr. 30, 2019 (18 pages).

(Continued)

*Primary Examiner* — Syed H Hasan
(74) *Attorney, Agent, or Firm* — Middleton Reutlinger

(57) ABSTRACT

Consolidation of disparate data source queries is provided. An application intake component can receive an application package file, and process the file to identify one or more actions and entities for the application. A natural language processor component can receive an input audio signal to identify an action and an entity on which to perform the action. An application delivery component can identify applications that can perform the action and applications that have access to the entity, and then select an application that is configured to perform the action on the entity. The application delivery component can provide an indication of the application selected by the system to a client device.

20 Claims, 4 Drawing Sheets

(51) Int. Cl.
  *G06F 16/9532* (2019.01)
  *G06F 3/16* (2006.01)

(56) References Cited

U.S. PATENT DOCUMENTS

| | | | |
|---|---|---|---|
| 2011/0276568 A1* | 11/2011 | Fotev | G06F 16/951 |
| | | | 707/728 |
| 2012/0084292 A1 | 4/2012 | Liang et al. | |
| 2012/0240236 A1 | 9/2012 | Wyatt et al. | |
| 2012/0284247 A1* | 11/2012 | Jiang | G06F 16/9535 |
| | | | 707/706 |
| 2013/0191397 A1* | 7/2013 | Avadhanam | G06F 16/24578 |
| | | | 707/748 |
| 2013/0331141 A1* | 12/2013 | Montemurro | H04W 4/06 |
| | | | 455/515 |
| 2014/0006374 A1 | 1/2014 | Forte et al. | |
| 2014/0006418 A1* | 1/2014 | Forte | G06F 16/9535 |
| | | | 707/748 |
| 2015/0370874 A1* | 12/2015 | Bansal | G06F 9/5055 |
| | | | 707/756 |
| 2017/0060966 A1 | 3/2017 | Glover et al. | |
| 2018/0018576 A1* | 1/2018 | Boyer | G06N 20/00 |
| 2018/0253757 A1 | 9/2018 | Foladare et al. | |

OTHER PUBLICATIONS

European Patent Office; Communication Pursuant to Article 94(3) EPC issue in Application No. 19707184.8; 9 pages; dated Feb. 9, 2021.
Intellectual Property India; Office Action issued in Application No. 202027053613; 7 pages; dated Jul. 14, 2021.
The Korean Intellectual Property Office; Notice of Office Action issued in Application No. 10-2020-7030954; 14 pages; dated Nov. 18, 2021.
Intellectual Property India; Examination Report issued in Application No. 202027053613; 7 pages; dated Jul. 14, 2021.
Japanese Patent Office; Notice of Reasons for Rejection issued in Application No. 2020-553517; 8 pages; dated Jan. 11, 2022.

* cited by examiner

CONSOLIDATION OF RESPONSES FROM QUERIES TO DISPARATE DATA SOURCES

CROSS-REFERENCE TO RELATED APPLICATIONS

This application is a U.S. National Stage under 35 U.S.C. § 371 of International Patent Application No. PCT/US19/16917, filed on Feb. 6, 2019 and designating the United States, which application claims priority under 35 U.S.C § 119 to U.S. Provisional Patent Application No. 62/770,338, filed Nov. 21, 2018, each of which is herein incorporated by reference in its entirety.

BACKGROUND

A server can receive a request for information. The server can route the request for information to numerous databases or servers in order to obtain the requested information.

SUMMARY

The present technical solution is generally directed to consolidating responses from queries to disparate data sources. At least one aspect of the present technical solution is directed to a system to consolidate disparate data source queries. The system can include a data processing system. The data processing system can include one or more processors and memory. The data processing system can include an application intake component, a natural language processing component, and an application delivery component. The data processing system can receive application package files. The data processing system can receive the application package files from a plurality of developer computing devices. The application package files can include instructions to distribute and install a plurality of applications on a plurality of computing devices. Each of the application package files can be associated with an action-inventory file. The data processing system can process the action-inventory file to identify one or more electronic actions the mobile application performs. The data processing system can process the action-inventory file to identify corresponding one or more entities on which the mobile application performs the one or more electronic actions. The data processing system can receive, via an interface of the data processing system and a network, data packets comprising an input audio signal detected by a sensor of a client device. The data processing system can parse the input audio signal to identify an action and an entity on which to perform the action. The data processing system can select, based on the action-inventory file, a first one or more applications of the plurality of applications configured with access to the entity identified from the input audio signal and configured to perform the action identified in the input audio signal. The data processing system can provide, to the client device, an indication of the application selected by the data processing system to cause the client device to initiate execution of the application to perform the action using the entity identified in the input audio signal.

The data processing system can identify a first one or more applications configured to perform the action identified from the input audio signal. The data processing system can select, from the first one or more applications and the second one or more applications, an application configured to perform the action and access the entity identified from the input audio signal.

At least one aspect of the present technical solution is directed to a method of consolidating disparate data source queries. The method can include the data processing system receiving application package files comprising instructions to distribute and install a respective plurality of applications on a plurality of computing devices. The application package files can each be associated with a respective action-inventory file. The data processing system can receive the application package files from a plurality of developer computing devices. The method can include the data processing system processing each action-inventory file to identify one or more electronic actions the respective application performs and corresponding one or more entities on which the mobile application performs the one or more electronic actions. The method can include the data processing system receiving, via an interface of the data processing system and a network, data packets comprising an input audio signal detected by a sensor of a client device. The method can include the data processing system parsing the input audio signal to identify an action and an entity on which to perform the action. The method can include the data processing system selecting, based on the action-inventory file, a first one or more applications of the plurality of applications configured with access to the entity identified from the input audio signal and configured to perform the action identified in the input audio signal. The method can include the data processing system providing, to the client device, an indication of the application selected by the data processing system to cause the client device to initiate execution of the application to perform the action using the entity identified in the input audio signal.

The method may include one or more of the following features. The method can include the data processing system identifying a first one or more applications configured to perform the action identified from the input audio signal. The method can include the data processing system selecting, from the first one or more applications and the second one or more applications, an application configured to perform the action and access the entity identified from the input audio signal. Identifying a second one or more applications configured to perform the action identified from the input audio signal. Providing an indication of the application selected by the data processing apparatus can comprise: selecting, from the first one or more applications and the second one or more applications, an application configured to perform the action and access the entity identified from the input audio signal; and providing the application selected from the first one or more applications and the second one or more applications. Receiving the action-inventory file comprising an extensible markup language file. Receiving the action-inventory file comprising a pointer to a list of entities. Receiving, for at least one of the plurality of applications, the action-inventory file comprising a uniform resource locator to a web page established via a developer computing device; and determining an inventory of entities from the web page of the developer computing device. Receiving, for at least one of the plurality of applications, the action-inventory file comprising a uniform resource locator to web page comprising a structured markup of entities; accessing the web page via the uniform resource locator; parsing the web page with the structured markup of entities to identify an inventory of entities; associating, in a database, the inventory of entities with the at least one of the plurality of applications. Identifying, from the input audio signal, the application; and selecting the application based on the first one or more applications, the second one or more applications, and the input audio signal. Executing a web search via a search engine based on at least one of the action and the entity identified from the input audio signal; and identifying at least one of the first one or more applications or the second one or more applications based on results of the web search output by the search engine. Executing a web search via a search engine based on at least one of the action and the entity identified from the input audio signal to identify a second plurality of applications; ranking each of the second plurality of applications; and selecting a highest ranking application from the second plurality of application as the application for which to provide the indication to the client device. Executing a web search via a search engine based on at least one of the action and the entity identified from the input audio signal to identify a second plurality of applications; scoring each of the second plurality of applications based on performance feedback associated with the action; and selecting a highest scoring application from the second plurality of application as the application for which to provide the indication to the client device. Executing a web search via a search engine based on at least one of the action and the entity identified from the input audio signal to identify a second plurality of applications; scoring each of the second plurality of applications based on historical preference information associated with the client device for the action; and selecting a highest scoring application from the second plurality of application as the application for which to provide the indication to the client device. Identifying the entity from the input audio signal based on a graph database comprising a hierarchical taxonomy of entities each having a unique identifier formed of a domain, type and property. Identifying the entity from the input audio signal based on a graph database comprising a hierarchical taxonomy of entities each having a unique identifier formed of a domain, type and property; and identifying the first one or more applications or the second one or more applications based on a web search using the entity. Identifying the entity from the input audio signal based on a graph database comprising a hierarchical taxonomy of entities each having a unique identifier formed of a domain, type and property; identify, via a database, a set of actions configured for the entity; and identifying the second one or more applications based on the set of actions configured for the entity.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
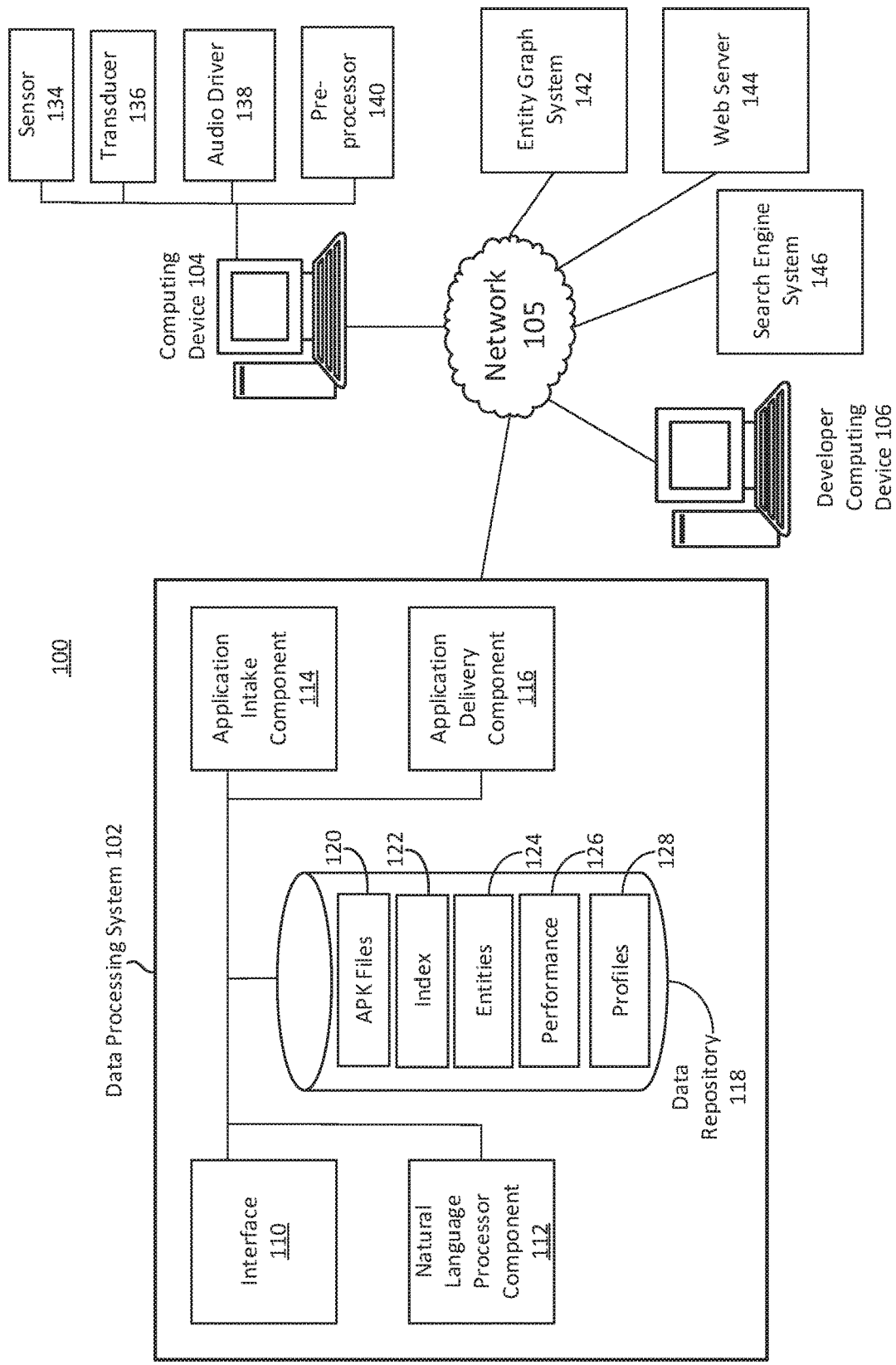
FIG. 1 is an illustration of a system to consolidate disparate data source queries, in accordance with an implementation.

Following below are more detailed descriptions of various concepts related to, and implementations of, methods, apparatuses, and systems of consolidating disparate data source queries. The various concepts introduced above and discussed in greater detail below may be implemented in any of numerous ways.

The present technical solution is generally directed to consolidating disparate data source queries. For example, applications can execute on a computing device. The application can be developed, created or otherwise provided by a third-party developer via a developer device. The application, such as a mobile application, can be configured to execute or perform certain types of actions on certain types of data files, resources, or other content. For example, a mobile application can be configured for execution on a mobile computing device such as a smartphone to perform an action such as "play" on a digital or electronic resource such as a music file. The mobile application can be referred to as a music application. Developers can provide various types of applications, such as video player application, music player application, augmented reality application, news applications, electronic book applications, video game applications, recipe applications, ticket purchasing applications, clothing applications, e-commerce applications, or ride sharing applications, for example.

The application or mobile application can execute on a computing device or mobile computing device. The application can execute partially on the computing device and partially on a data processing system. The application can execute on the data processing system and receive input from the computing device. For example, a data processing system can receive an input audio signal (e.g., voice input) from a computing device, and parse the input audio signal to identify an action (e.g., play music) and an entity (e.g., a particular artist or song) on which to perform the action. Applications can refer to applications on various platforms, including different types of mobile devices, computing device, operating systems, conversational applications, or chatbot applications.

However, it can be challenging for the data processing to determine which application can perform the action, as well as which application has access to the entity. For example, each application or developer of the application can store electronic data files in a different database or data repository. Each application or developer of the application can indicate the types of actions the application can perform using one or more techniques. The indication of the action and electronic data files or entities on which the action can be performed can be in various formats or locations. Thus, it can be challenging for a voice-based computing environment to receive an input audio signal with a request to perform a type of action on a certain entity to efficiently, accurately, and reliably select an application that can perform the type of action on the requested entity.

For example, application developers may not semantically specify the function of their application (e.g., play movies, get news, order food, or order a ride) and provide an inventory for the entities their application works on (e.g., movie names). This makes it challenging for a data processing system to select, trigger or suggest these applications when an input audio signal from a use requests performance of certain tasks or action via a digital assistant.

Thus, systems and methods of the present technical solution can solve the technical problem of matching action providers to user queries by providing information relating to intents that applications can serve and associated inventory, and use this inventory while searching for the provider to serve the user query. This technical solution can also be used to perform entity pivoting in order to pivot on actions based on the entity specified in the user requests. For example, if a user asks about a height of a musician, the data processing system may provide action based suggestions related to musician such as play music, show musicians recent online posts, buy tickets for the musician.

To do so, the data processing system of the present technical solution can combine or consolidate structured data feeds and web pages to (1) match queries to corresponding providers, and (2) generate entity-based application action recommendations. For example, for a given entity, the data processing system can recommend applications that explicitly provide actions for an entity (e.g., via feeds) cross-ranked with applications associated with web pages that are related to the entity. To do this, the data processing system can combine or consolidate results from various processes, techniques, infrastructures, or data sources including, for example: parsing or natural language processing to identify entities from a user query; web search techniques to identify entities from web content and feeds; structured data feeds containing uniform resource locators (URLs) or deep links to the application; knowledge of a level of relatedness a given entity in structured feed item or a web page has to the query; or indexes of web URLs to corresponding deep links to the applications.

The data processing system can combine these infrastructures in a configuration driven way to determine when and how to search these siloed data sources and to combine the results of these distinct data sources, re-rank the results, match the results to application developer provided inventory specification to understand the intent the result is satisfying (e.g., GET_RECIPE or PLAY_MOVIE) to create a sorted list of agents or applications which can fulfill the user requests. The data processing system can further improve the suggestions by filtering the recommendation to only applications that are installed on the client device. Since each data source or vertical within a data source may have a different request and response format, the data processing system can receive from the application developer devices a specification for creating the requests from user query and user context using a set of configurations. The application developers can use the configurations to convert the responses into a common format for further processing. Thus, the data processing system can combine structured data feeds and unstructured data feeds; (2) use any knowledge graph to process queries across any vertical; and (3) provide any type of fulfillment for any type of device. The techniques described herein can allow a device to only open applications that are able to fulfil a request. Opening an application on a device typically utilizes significant computer resources and by first determining whether an application is able to fulfil a request before opening the application, the subject matter described herein can reduce computer resource utilization.

FIG. 1 illustrates an example system 100 for consolidating disparate data source queries. The system 100 can include content selection infrastructure. The system 100 can include a data processing system 102. The data processing system 102 can communicate with one or more of a developer computing device 106 or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a developer computing device 106. The computing device 104 (or client device) may or may not include a display; for example, the computing device may include limited types of user interfaces, such as a microphone and speaker. In some cases, the primary user interface of the computing device 104 may be a microphone and speaker. The computing device 104 can interface with or be included in a voice-based computing environment.

The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the developer computing device 106. The network 105 can include or constitute a sub-network of information resources available on the internet that are associated with a content placement or search engine results system, or that are eligible to include third party digital components as part of a digital component placement campaign.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, developer computing device 106 (e.g., content provider). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one developer computing device 106. The developer computing device 106 can include at least one logic device such as a computing device having a processor to communicate via the network 105, for example with the computing device 104, or the data processing system 102. The developer computing device 106 can include at least one computation resource, server, processor or memory. For example, the developer computing device 106 can include a plurality of computation resources or servers located in at least one data center. The developer computing device 106 can include one or more component or functionality of the data processing system 102. The developer computing device 106 can include or refer to an application developer device, service provider device, or goods provider device. The developer computing device 106 can be used to develop the applications. The developer computing device 106 can be used to partially develop the application. The developer computing device 106 can be used to provide the application to the data processing system 102. The developer computing device 106 can be used to otherwise facilitate providing the application or providing a functionality associated with the application.

The computing device 104 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can be configured to detect a trigger keyword, predetermined hot word, initiation keyword, or activation keyword. In some cases, the trigger keyword can include a request to perform an action. In some cases, the trigger keyword can include predetermined action keyword to enable or activate the computing device 104, and the request keywords can follow the trigger keyword or hot word. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 104 can be associated with an end user that enters voice queries as audio input into the client computing device 104 (via the sensor 134) and receives audio output in the form of a computer generated voice that can be provided from the data processing system 102 (or the developer computing device 106) to the client computing device 104, output from the transducer 136 (e.g., a speaker). The computer generated voice can include recordings from a real person or computer generated language.

The data processing system 102 can include a content placement system having at least one computation resource or server. The data processing system 102 can include an online application delivery platform configured to select, deliver or provision applications for execution or interaction by a computing device 104. The application can execute on the computing device 104, at least partially on the computing device 104 and partially on the data processing system 102, or entirely on the data processing system 102 such that input and output of the application are provided via the computing device 104 but the application otherwise executes on the data processing system 102. The application can execute at least partially on the developer computing device 106.

The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one application intake component 114. The data processing system 102 can include, interface, or otherwise communicate with at least one application delivery component 116. The data processing system 102 can include, interface, or otherwise communicate with at least one data repository 118. The at least one data repository 118 can include or store, in one or more data structures or databases, application package (APK) files 120, index 122, entities 124, performance data 126, or profiles 128.

An APK file 120 can refer to an application package kit or application package file or other application-related file. The data processing system 102 can store, in data repository 118, APK files for multiple applications. The data processing system 102 can store one or more APK files for each application the data processing system 102 is configured to deliver to computing devices 104. APK files 120 can distribute and install application on a computing device. APK files 120 can be in a format configured for the distribution of the application from a data processing system 102 to a computing device 104 for installation on the computing device 104. An application can have one or more APK files 120 in one or more formats. For example, a single application can have an APK file 120 in a first format configured to distribute the application using a first delivery platform for installation on a first type of computing device 104; and a second APK file 120 in a second format configured to distribute the application via a second delivery platform to a second type of computing device 104. The APK file 120 can include instructions, source code, executable code, machine readable code, scripts, functions, images, audio files, video files, or configuration files. The APK file can include instructions (or code) to facilitate distribution and installation of the application.

The APK file 120 can be associated with an action-inventory file. The action-inventory file can be part of the APK file 120. The action-inventory file can be provided as part of or with the APK file 120. For example, the developer of the application can provide the action-inventory file along with the APK file 120 for the application. The action-inventory file can be a separate file and separate from the APK file 120. The action-inventory file can be associated with the APK file 120 (e.g., included as part of the APK file 120, having an identifier that matches or corresponds to the APK file, linked via a reference or uniform resource indicator to the APK file 120, via a pointer, or mapped or linked to one another in an index). The action-inventory file can indicate actions the application can perform. The action-inventory file can indicate the entities on which the application can perform the indicated actions. The action-inventory file can include a pointer, URI, URL or reference to another data source containing information about the entities on which the application can perform the indicated actions. The action-inventory file can include deep links to the entity within the application. The action-inventory file or APK file can include a pattern used to construct a deep link to the entity in the application.

The index 122 stored in data repository 118 can include a mapping of applications to actions. The index 122 stored in data repository 118 can include a mapping of applications to entities. The index 122 stored in data repository 118 can include a mapping of actions to entities. The index 122 can include deep links to entities of the application to direct the application to the entity or open the entity upon launching or opening the application. The index 122 can be updated periodically, based on a time interval, or responsive to other event or condition, such as intake of a new application or an updated application or new inventory (e.g., entities). The data processing system 102 can maintain the index 122 on the data repository 118 on the data processing system 102. In some cases, the data processing system 102 can maintain an index 122 for a computing device 104 in local memory of the computing device 104, such as in a local index 122 stored on the computing device 104. The local index 122 can include, for example, information about entities that may be available or stored on a local computing device 104 to which the data processing system 102 may not have access otherwise, or that the data processing system 102 can access via the computing device 104.

The data processing system 102 can store entities 124 or indications of entities 124 in the data repository 118. An indication of an entity can refer to or include a unique identifier of the entity. The unique identifier can include, for example, alphanumeric values, strings, characters, numeric values, or domain, property and type information. An entity can be a single person, place or thing, and the repository can include millions of entities that each have a unique identifier to distinguish among multiple entities with similar names (e.g., a Jaguar car versus a jaguar animal). A data processing system 102 can access a reference entity and scan arbitrary pieces of text (e.g., text in web pages, text of keywords, text of content, text of advertisements) to identify entities from various sources. One such source, for example, may be an entity graph system 142. The entity graph system 142 can include a manually created taxonomy of entities such as an entity graph of people, places and things, built by a community of users. The data processing system 102 can interface, access, or otherwise communicate with the entity graph system 142 via network 105.

The data processing system 102 may use entities to select applications to perform on action on the entity in multiple ways. The data processing system 102 can obtain a classification of a plurality of entities. An entity may be a single person, place, thing or topic. Each entity has a unique identifier that may distinguish among multiple entities with similar names (e.g., a Jaguar car versus a jaguar animal). A unique identifier ("ID") may be a combination of characters, text, numbers, or symbols. The data processing system may obtain the classification from an internal or third-party database via network 105. In one implementation, the entities may be manually classified by users of a user device (e.g., computing device 104). For example, users may access the database of entities via network 105. Users may upload at least one entity or upload multiple entities in a bulk upload. Users may classify the uploaded entities, or the upload may include the classification of at least one entity. In some implementations, upon receiving an entity, the data processing system 102 may prompt the user for a classification.

In some implementations, entities can be classified. Classifications may indicate the manner in which entities are categorized or structured, e.g., ontology. For example, an ontological classification may include attributes, aspects, properties, features, characteristics, or parameters that entities can have. Ontological classifications may also include classes, sets, collections, concepts, or types. For example, an ontology of "vehicle" may include: type—ground vehicle, ship, air craft; function—to carry persons, to carry freights; attribute—power, size; component—engine, body; etc. In some implementations, the manual classification includes structured data that provides a manually created taxonomy of entities. Entities may be associated with an entity type, such as people, places, books, or films, for example. Entity types may include additional properties, such as date of birth for a person or latitude and longitude for a location, for example. Entities may also be associated with domains, such as a collection of types that share a namespace, which includes a directory of uniquely named objects (e.g., domain names on the internet, paths in a uniform resource locator, or directors in a computer file system). Entities may also include metadata that describes properties (or paths formed through the use of multiple properties) in terms of general relationships.

The data processing system 102 or an administrator of the entity graph system 142 may classify an entity based on a domain, type, and property. For example, a domain may be American musicians and have an ID "/music". This domain may be associated with a music type with ID "/music/ pop_music". This type may include a property for pop music musician "/music/pop_music/musicians". Each domain, type, property or other category may include a description. For example, "/music/pop_music" may include the following description: "Music refers to a vocal or instrumental sound and pop music can refer to current commercial popular music." In some implementations, the data processing system 102 can scan text or other data of a document and automatically determine a classification. For example, the data processing system 102 may scan information resources via network 105 for information about musicians, and classify that information as "/music/pop_music/musicians/female_musicians". The data processing system 102 may further assign the entity female musicians a unique identifier that indicates a classification.

Entities may be classified, at least in part, by one or more humans ("entity contributors"). This may be referred to as manual classification. In some implementations, entities may be classified using crowd sourcing processes. Crowd sourcing may occur online or offline and may refer to a process that involves outsourcing tasks to a defined group of people, distributed group of people, or undefined group of people. An example of online crowd sourcing may include an administrator of an entity graph system 142 assigning the task of uploading or classifying entities to an undefined set of users. Users may add, modify, or delete classifications online. An example of offline crowd sourcing may include assigning the task of uploading or classifying entities to an undefined public not using the network 105.

Performance data 126 can include, for example, information about how well an application performs an action. Performance 126 can include, for example, information about how well an application performs an action on an entity. Performance data 126 can be based on historical performance or uses. Performance data 126 can be based on feedback or ratings. Performance data 126 can be in the form of metrics, such as quality metrics, latency metrics, time metrics, memory usage metrics, processor usage metrics, network bandwidth usage. Performance metrics can indicate the amount of time the application takes to perform the action, or the amount of time the application takes to launch. Performance data 126 can indicate a level of efficiency of the application when performing an action. The action can be an action identified via the APK file or action-inventory file that has been indexed or mapped to the application. Performance metrics can include values (e.g., memory consumption values, processor utilization values, or time) or alphanumeric indicators. Performance metrics can include a scale, grade, range or spectrum, such as low, medium, high, or a scale of 1 to 10, or a grading system such as A, B, C, D, F. The data processing system 102 can use the performance metrics to select or rank applications for delivery.

Additional performance information 126 can indicate errors or failures associated with an application. For example, if an application, via an APK file or action-inventory file, indicates that it can perform a certain type of action on a certain type of entity, but the application crashes, fails or has errors when attempting to perform the action on the entity, then the data processing system 102 can store the error log in the performance data structure 126 in data repository 118. The data processing system 102 can determine that the application may not be configured, capable or otherwise operational to perform the action on the entity contrary to what was indicated in the action-inventory file. Thus, the data processing system 102 can determine to update the index 122 to remove a mapping or link between the application and the corresponding action and entity responsive to determining that the application is unable to perform the action on the entity to a satisfactory level (e.g., crashes, errors, excessive delay, latency, or very low quality such as sound quality or video resolution). The data processing system 102 can provide an indication, notification or alert to the developer computing device 106 that provided the application to allow the developer to update the application or action-inventory file to resolve or remedy the error. The data processing system 102 can use the error logs stored in the performance data structure 126 to determine to block selection of the application to perform the action on the entity contrary to the action-inventory file that indicates that the application is configured to perform the action on the entity.

The data repository 118 can store profile information 128. Profile information can include or refer to information associated with a computing device 104. Profile information can include or refer to information associated with an account configured on the computing device 104. Profile information can indicate a configuration of a computing device 104 or account activated on the computing device 104. Profile information can indicate which applications are installed on the computing device 104, or which applications are available or accessible to the computing device 104. Profile information can include or indicate entities that are stored on or accessible to the computing device 104. Profile information can include or indicate user preferences for applications, actions, or entities.

The data processing system 102 can interface, access, use or otherwise communicate with a search engine system 146. A search engine 146 can refer to or include a system that crawls web pages or web sites on the Internet in order to index the web pages and store the index in a database. A search engine system 146 can include one or more programs that searches and identifies items in the database that correspond to keywords or characters specified in an input to the search engine.

The data processing system 102 can interface, access, use or otherwise communicate with a web server 144. Web servers 144 can host web sites or web pages. Web servers 144 can host web sites developed by a developer computing device 106 and published on the Internet. For example, the developer computing device 106 can markup using a structured data tagging scheme a web page to indicate entities on which the application provided by the developer computing device 106 can perform an action.

The interface 110, natural language processor component 112, application intake component 114 or application delivery component 116 can each include at least one processing unit or other logic device such as programmable logic array engine, or module configured to communicate with the database repository or data repository 118. The interface 110, natural language processor component 112, application intake component 114, application delivery component 116 and data repository 118 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application intake component 114 designed, constructed, configured, or operational to receive an application package file and an associated action-inventory file, and process the action-inventory file to identify one or more electronic actions the mobile application performs and a corresponding one or more entities on which the application performs the electronic action. The application intake component 114 can provide a user interface, graphical user interface, or other mechanism by which a developer computing device 106 can transfer the application package file and an associated action-inventory file. For example, the developer computing device 106 can upload the application package file via an interface 110 of the data processing system 102. The data processing system 102 can retrieve the application package file from a location on the developer computing device 106.

The data processing system 102 can receive multiple application files from multiple developer computing devices 106. The application package files can include instructions to distribute and install the applications on computing devices 104. The instructions can include or refer to software code, an executable file, programs, scripts, or functions. The application package file can further provide criteria or system requirements that are to be met in order for the application to execute on a computing device 104. For example, the application package file can specify compatibility information such as a type of operating system, type of computing device, required interfaces (e.g., keyboard, mouse, touch screen, sensors, display, speaker, microphone), processor requirements, storage requirements, or memory requirements. The application delivery component 116 can use the compatibility information select an application to deliver to the computing device 104.

Each application package file can be associated with an action-inventory file. The action-inventory file can indicate the types of actions the application is configured to perform. Actions can be referred to as electronic actions as they are performed by a program executed on a computing device. Actions can include, for example, playing audio, play video, multimedia, providing recipes providing news, providing weather information, ordering a ride sharing service, e-commerce, purchasing tickets, etc.

The action-inventory file can further indicate entities on which the application is configured to perform an action. The set of entities can be referred to as an inventory of the application. The action-inventory file can be a data file, text file, comma delimited file, table, data structure or any other file or be in any format configured to indicate the action and inventory information. The action-inventory file format can an extensible markup language XML file, such as a meta-language which allows users to define their own customized markup languages.

The action-inventory file can include a pointer to a list of entities. The action-inventory file can include a uniform resource locator to a web page established via a developer computing device, and the data processing system 102 can determine an inventory of entities from the web page of the developer computing device. The action-inventory file can include a reference, pointer, URL or other indication to a list of entities. For example, the action-inventory file may not itself store the list of entities on which the application is configured to perform the one or more actions, but may include a link to a web page or web site or other data file separate from or stored remotely from the action-inventory file. For example, the action-inventory file can include a set of actions, but then include a URL to a web page that indicates entities on which the application can perform the action. For example, the action can be "play music", and the inventory of entities (e.g., song catalog) can be stored on a web page (e.g., hosted by web server 144). By storing the inventory of entities on a web page, the developer computing device 106 can update the inventory list without having to provide a new action-inventory file or application package file to the data processing system 102, thereby reducing the number of times the application intake process is performed by the data processing system 102, which can reduce processor utilization by the data processing system 102.

The data processing system 102 can parse or process the action-inventory file to identify a link or reference to a web page. The web page can contain structured data. Structured data can refer to a web page with additional markup to the HTML page to allow bots, spiders or web crawlers to better understand information on the web page. The data processing system 102 (e.g., via the application intake component 114) can parse or process the structured data of the web page to identify an inventory of entities that the developer indicates are available to the application and the application can use to perform the action. The structured data can indicate information about the entities, such as a unique identifier of the entity (e.g., a domain, property and type), an alphanumeric identifier of the entity, a description of the entity, keywords associated with the entity, or other information.

The data processing system 102 can leverage the structured data on the web page to identify an entity, and further leverage the entity graph system 142 to identify additional information about the entity. For example, the data processing system 102 can parse the structured data to identify the entity, and then access the entity graph system 142 to obtain additional information about the entity. The structured data on the web page may include a unique identifier of the entity, which the data processing system 102 can use to identify, via the entity graph system 142, additional entities associated with the identified entity. For example, the entity "Artist_A" can be identified from the web page, however the data processing system 102 can query the entity graph system 142 to identify albums, songs, concerts, tickets, or bands associated with "Artist_A".

In some cases, the web page may not provide the unique identifier of the entity, in which case the data processing system 102 can process the web page to identify a keyword or a candidate entity, and then query the entity graph system 142 to determine the unique entity identifier along with information associated with the entity. For example, the web page may not include or lack a structured inventory of entities. The data processing system 102 can determine the web page lacks the structured inventory of entities based on determining that a structured identifier pattern is absent from the web page. The data processing system 102 can then determine that the web page contains information that is not structured, and then leverage the entity graph system 142 to determine what entities are available on the web page by querying the entity graph system 142 with keywords or terms identified on the web page to determine a corresponding entity in the entity graph system 142. The data processing system 102 can combine or consolidate unstructured data on a web page with structured data of an entity graph system 142 to identify an entity and associated entities. Thus, the data processing system 102 can process action-inventory file, structured data from a web page, or unstructured data from a web page identified in the action-inventory file to identify an inventory of entities for the application as well as actions the application is configured to perform or execute.

The data processing system 102 can store, in index 122, the inventory of entities of the application along with actions the application can perform on the entities. The index 122 can include an identifier of the application, such as a unique application identifier (e.g., alphanumeric identifier). The index 122 can associate the application identifier with an action and corresponding entities or inventory of entities. The application can be configured to perform one or more actions on one or more entities.

Thus, the data processing system 102 can receive, for an application, the action-inventory file including a uniform resource locator to web page having a structured markup of entities. The data processing system 102 can access the web page via the uniform resource locator, and then parse the web page with the structured markup of entities to identify an inventory of entities. The data processing system 102 can associate, in a database, the inventory of entities with the at least one of the plurality of applications.

The application intake component 114 can perform a validation or error checking process to validate or determine whether the application can perform the actions on the entities. For example, the data processing system 102 can select an action and an entity and instruct the application to perform the action on the entity. If the application fails, crashes, has a delay, utilizes excessive memory, storage or processing, the data processing system 102 can determine that the application is not configured to perform the action on the entity or fails a quality check process. The data processing system 102 can disable the action or the entity for the application responsive to failure of the quality check process. The data processing system 102 can disable the application entirely for subsequent delivery. The data processing system 102 can remove (or block the addition of) the association between the application and the action or the entity in the index 122. The data processing system 102 can notify the developer computing device 106 of the error to allow the developer to remedy or resolve the error.

The data processing system 102 can include an application, script or program installed at the client computing device 104, such as an app to communicate input audio signals to the interface 110 of the data processing system 102 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 118) and choosing the closest matches. The set of audio waveforms can be stored in data repository 118 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) and provided to the NLP component 112 or stored in the data repository 118.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can identify search queries or trigger phrases corresponding to performing a search or other request for information. The NLP component 112 can determine that the input audio signal corresponds to a request for information about a topic, event, current event, news event, dictionary definition, historical event, person, place or thing. For example, the NLP component 112 can determine that the input audio signal corresponds to a search query for information about a historical event, such as "When did the American Revolution take place?"

The NLP component 112 can filter the input audio signal to identify the keywords, search query, or trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In another example, the data packets carrying the input audio signal can include "Can you please play song123 by Artist_A", in which case the NLP component 112 can filter out one or more terms as follows: "can", "you", "please". By filtering out these terms, the NLP component 112 may more accurately and reliably identify the trigger keywords, the intent, the action, and the entity. For example, the intent can be to play music, the action can be "play" and the entity can be "song123 by Artist_A." Thus, the natural language processing component 112 can determine the intent by parsing and analyzing the input audio signal or data packets carrying the input audio signal in order to determine the action and the entity on which to perform the action. The data processing system 102 can identify the entity from the input audio signal based on a graph database provided by an entity graph system 142 comprising a hierarchical taxonomy of entities each having a unique identifier formed of a domain, type and property.

In another example, the data packets carrying the input audio signal can include "Can Application_A please play song123 by Artist_A", in which case the NLP component 112 can filter out one or more terms as follows: "can" and "please". By filtering out these terms, the NLP component 112 may more accurately and reliably identify the trigger keywords, the intent, the action, the entity, and the request application. For example, the intent can be to play music, the action can be "play", the entity can be "song123 by Artist_A", and the application the user is requesting to perform the action on the entity can be "Application_A". Thus, the natural language processing component 112 can determine the intent by parsing and analyzing the input audio signal or data packets carrying the input audio signal in order to determine application to perform the action, and the entity on which the application is to perform the action.

Thus, the data processing system 102 (e.g., via the interface 110 and natural language processor component 112) can receive data packets including an input audio signal detected by a sensor of a client device, and then parse the input audio signal to identify an action and an entity on which to perform the action. The data processing system 102 can identify an intent, which can be formed of, or based on, the action and the entity. The input audio signal can indicate the application to perform the action on the entity, and the data processing system 102 can identify the application from the input audio signal.

The data processing system 102 can include, execute, or otherwise communicate with an application delivery component 116 to identify an application that can execute the action and the entity identified from the input audio signal, and then provide an indication to the client device or otherwise cause the application to execute the action on the entity. For example, the application delivery component 116 can identify a first one or more applications configured to perform the action identified from the input audio signal, a second one or more applications of the plurality of applications configured with access to the entity identified from the input audio signal, and select, from the first one or more applications and the second one or more applications, an application configured to perform the action and access the entity identified from the input audio signal. The data processing system 102 can then provide, to the client device, an indication of the application selected by the data processing system to cause the client device to initiate execution of the application to perform the action using the entity identified in the input audio signal.

The application delivery component 116 can perform the selection in real-time. The real-time selection process can be performed (e.g., initiated or completed) within a time interval of receiving the request (e.g., 1 second, 2 seconds, 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated.

To select an application to execute the action on the entity, the data processing system 102 can identify applications that are configured to perform the action. The data processing system 102 can identify the applications that can perform the action using one or more system or technique. For example, the data processing system 102 can perform a lookup in the index 122 to identify applications that are associated with the action identified from the input audio signal. The data processing system 102 can determine, responsive to the lookup in the index 122, unique application identifiers.

The data processing system 102 can input a query into the search engine 146 to identify applications. For example, the data processing system 102 can input the action into a search engine 146. The data processing system 102 can construct or generate a query based on the action to identify applications. For example, the query can be "what applications can perform <action>?" or "what applications can perform <action> on <entity>?" or "identify applications that can perform <action> on <computing device type>". The data processing system 102 can receive the results of the search. The data processing system 102 can process the results to identify one or more applications that can perform the action.

Thus, the data processing system 102 can identify the action using structured data stored in the index 122, as well as unstructured web search results from the search engine 146 to identify one or more applications that are configured to perform the action. The data processing system 102 can consolidate the results into a first set of applications that are configured to perform the action.

The data processing system 102 can further identify which applications are configured to perform the action on the entity. The data processing system 102 can perform a lookup in index 122 using the entity identifier to determine which applications are associated with the entity. The data processing system 102 can input a query into a search engine to determine which applications can access the entity. For example, the data processing system 102 can construct a query such as "what applications have <entity>?".

In some cases, the data processing system 102 can execute or perform a single lookup or search to identify applications that perform the action on the entity, while in some cases the data processing system 102 can first identify applications that perform the action, and then identify applications that have access to the entity, and then identify which applications are in both sets of results. For example, the data processing system 102 can construct a query such as "what applications can perform <action> on <entity>?"

Thus, the data processing system 102 can execute a web search via a search engine 146 based on at least one of the action and the entity identified from the input audio signal, identify at least one of the first one or more applications or the second one or more applications based on results of the web search output by the search engine. The data processing system can identify the entity from the input audio signal based on a graph database provided by an entity graph system 142 including a hierarchical taxonomy of entities each having a unique identifier formed of a domain, type and property. The data processing system 102 can identify the first one or more applications or the second one or more applications based on a web search using the entity identified from the entity graph system 142. In some cases, the data processing system 102 can identify a set of actions configured for the entity using the index 122. The data processing system can identify the second one or more applications based on the set of actions configured for the entity.

The data processing system 102 can identify a first set of applications that are configured to perform the action, and a second set of applications that are configured to access the entity. The second set of applications can be identified independently from the process used to identify the first set of applications. For example, to reduce latency and delays due to computing processes, the data processing system 102 can execute multiple processes or queries in parallel. The data processing system 102 can identify the first set of applications that are configured to perform the action and in a parallel or overlapping process identify a second set of applications that are configured to access the entity.

In some cases, the data processing system 102 can identify the first set of applications and the second set of applications serially. For example, the data processing system 102 can identify the first set of applications that are configured to perform the action, and then identify, from the first set of applications, which of the first set of applications have access to the entity in order to generate the set of applications that can perform the action on the entity. The data processing system 102 can reduce memory or storage utilization by performing the second search or process related to the entities on the first set of applications, which can be a subset of all available applications.

In some cases, the data processing system 102 can perform a single process or query to identify applications that are configured to perform the action on the entity. For example, the data processing system can perform a lookup with multiple values (e.g., action and entity) or input a search query into search engine with multiple requests.

The data processing system 102 can consolidate results obtained from performing a lookup in the index 122 with results from the search engine 146. The data processing system 102 can validate the results from the search engine 146 by confirming whether the application can perform the action on the entity.

If the data processing system 102 identifies multiple applications that can perform the action on the entity, the data processing system 102 can provide an indication of the multiple applications to the computing device 104 to allow a user of the computing device 104 to select one of the applications. If the data processing system 102 identifies multiple applications that can perform the action on the entity, the data processing system 102 can rank the multiple application to suggest one or more of the applications. For example, the data processing system 102 can execute a web search via a search engine 146 based on at least one of the action and the entity identified from the input audio signal to identify a second plurality of applications. The data processing system 102 can then rank each of the second plurality of applications, score each of the second plurality of applications based on performance feedback associated with the action, or score each of the second plurality of applications based on historical preference information. The data processing system 102 can select a highest ranking or scoring application from the second plurality of application as the application for which to provide the indication to the client device.

The data processing system 102 can rank the multiple applications using various criteria. For example, the data processing system 102 can use performance information stored in the performance data structure 126 to rank the applications. The data processing system 102 can score each application based on the performance metrics. For example, the data processing system 102 can assign the highest performing application with the highest rank, the second highest performing application with the second highest rank, and so on.

For example, the data processing system 102 can determine that an application is the highest performing application based on feedback or ratings associated with the application, or performance metrics (e.g., least latency, fastest launch time, least memory or process or bandwidth utilization). If the data processing system 102 determines that the application performance is below a threshold (e.g., feedback rating or other performance metrics), the data processing system 102 can remove the application and determine not to suggest the application or include the application in the ranking. In some cases, the data processing system 102 can determine to provide or suggest only the top N ranking applications (e.g., the top 3 ranking application, top 2 applications, or top 5 applications).

The data processing system 102 can determine which applications are installed on the computing device 104. The data processing system 102 can rank the applications based on which applications are already installed on the computing device 104, thereby avoiding the need for the computing device 104 to download and install a new application. Thus, the top ranking applications from the identified set of applications can be the applications that are already installed on the computing device 104. If no applications from the identified set of applications are installed on the computing device 104, then the data processing system 102 can proceed to rank the applications based on performance, and then provide an indication to the computing device 104 to install an application from the ranked list in order to execute the action on the entity.

If the input audio signal includes an indication of the application, the data processing system 102 identify, from the input audio signal, the application and select the application based on the first one or more applications, the second one or more applications, and the input audio signal. For example, the data processing system 102 can determine whether the application identified in the input audio signal is included among the set of application identified by the data processing system 102 that are configured to perform the action on the entity, and then, upon identifying the match, select the application for execution.

Figure 2:
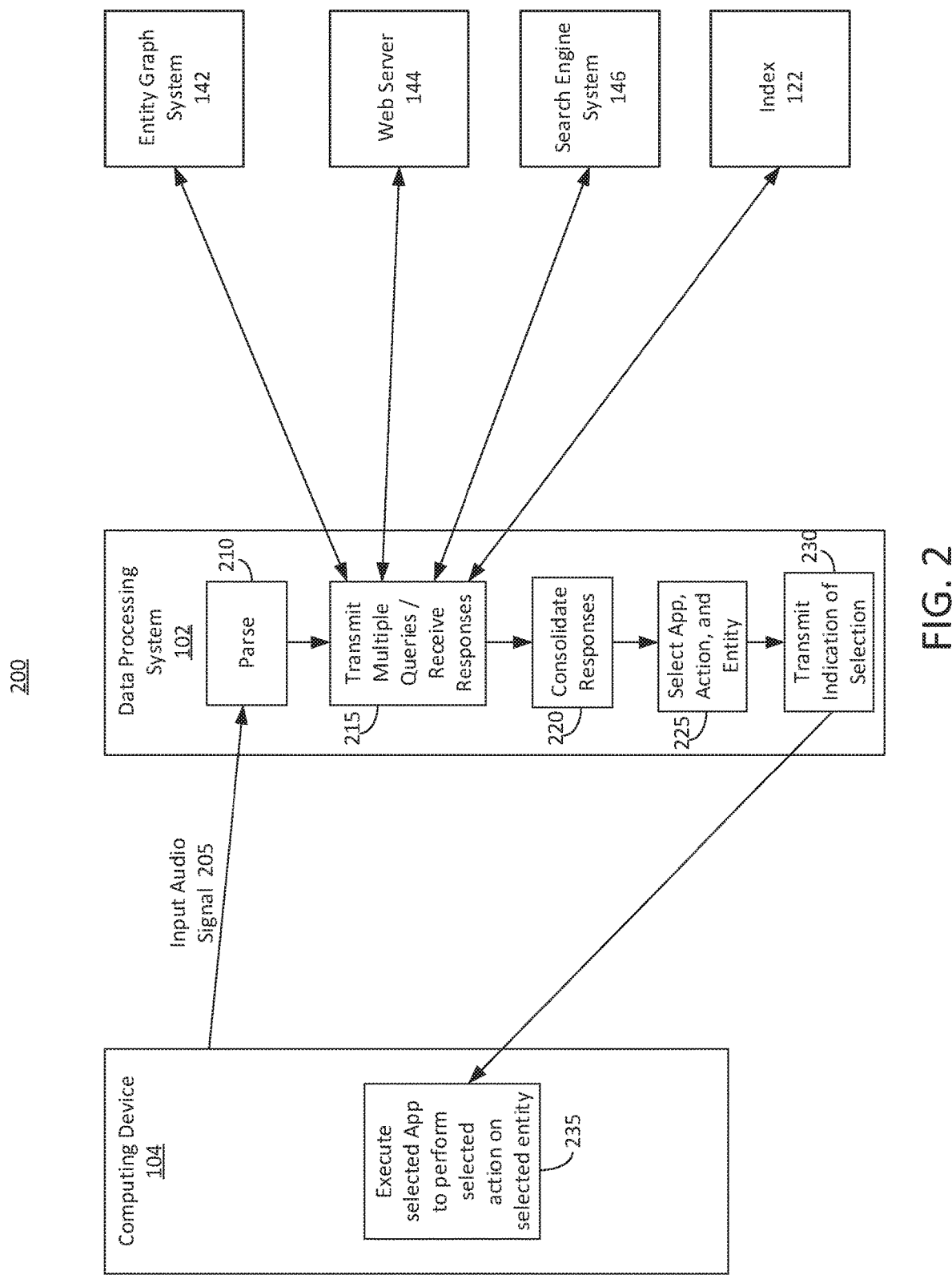
FIG. 2 is an illustration of an operation of a system to consolidate disparate data source queries, in accordance with an implementation.

FIG. 2 is an illustration of an operation 200 of the system 100 to consolidate disparate data source queries. The system can include one or more component of system 100 depicted in FIG. 1, including, for example, a computing device 104 and a data processing system 102. At 205, the data processing system 102 can receive the input audio signal detected by the computing device 104. The data processing system 102 can receive data packets comprising the input audio signal or indications of the input audio signal. The data processing system 102 can receive pre-processed terms, keywords, or phrases from the input audio signal. The data processing system 102 can receive a filtered version of the input audios signal.

At 210, the data processing system 102 can parse the received input audio signal (or received pre-processed or filtered version of the input audio signal). The data processing system 102 can parse the received data to identify an action and an entity in the input audio signal. The data processing system can use one or more processing techniques, machine learning, or natural language processing techniques to parse the data corresponding to the input audio signal. The data processing system 102 can parse the data to identify an action and an entity. The action can be performed on the entity. In some cases, the input audio signal can also include an indication of an application to use to perform the action on the entity.

The data processing system 102, to identify the action or entity, can query multiple data sources or databases. The multiple databases or data sources can be different, separate from one another, in different formats, contain different types of data (e.g., structured versus unstructured data) or other be disparate data sources. At 215, the data processing system can transmit multiple queries to the multiple databases or data sources including, for example, an entity graph system 142, web server 144, search engine system 146, or index 122.

For example, the data processing system 102 can query the entity graph system 142 with keywords or terms parsed from the input audio signal at 210 in order to determine a corresponding entity. The data processing system 102 can query the entity graph system 142 with a unique identifier of an entity in order to determine additional information about the entity or identify entities associated with the entity.

The data processing system 102 can query the web server 144 responsive to identifying, in the index 122, a pointer to a web page with a list of entities or an inventory of entities. For example, the data processing system 102 can identify an action in the input audio signal, perform a lookup in the index 122 to identify an application configured to perform the action. The data processing system 102 can then identify the action-inventory file associated with the APK file of the application. The action-inventory file can include a pointer or reference to a web page hosted by web server 144 that includes or indicates an inventory of entities for which the application can perform the action. Thus, the data processing system 102 can crawl or parse the web page to identify the inventory of entities.

The data processing system 102 can query a search engine 146 to identify applications. The data processing system 102 can construct a search query to identify application that can perform the action determined at 210 by parsing the input audio signal. The data processing system can construct a search query to identify an application that can perform the action on the entity determined at 210 by parsing the input audio signal.

At 215, the data processing system 102 can receive responses to the multiple queries transmitted to the multiple databases, systems or data sources. At 220, the data processing system can consolidate the responses to generate, identify or determine one or more applications that are configured to perform the action on the entity requested or indicated in the input audio signal. Consolidating the responses can refer to or include identifying a first set of applications that are configured to perform the action, a second set of applications that are configured to access the entity, and a final set of applications that are included in both the first and second sets that are configured to perform the action on the entity.

Consolidating the responses can refer to or include generating additional queries based on responses. For example, the data processing system 102 can query the index 122 to perform a lookup using the action to identify a set of applications. The data processing system 102 can also query the search engine 146 using the action to identify applications via a search engine results page. Thus, the data processing system 102 can query two different databases, data sources or systems in order to identify applications that can perform the action. The data processing system 102 can determine, via the search engine 146, that the top ranking applications that perform the action are Application_A and Application_B. The data processing system 102 can determine, via a lookup in the index 122, that there are twenty different applications that indicate, via respective action-inventory files, that they are configured to perform the action. The data processing system 102 can determine to rank, score or weight the Application_A and Application_B higher based on the search engine results from search engine 146.

In another example of consolidating queries, the data processing system 102 can query the index 122 with the action and entity to identify applications that can perform the action on the entity. The data processing system 102 can also identify, via the lookup, a pointer to a web page hosted by web server 144. The data processing system 102 can then access the web page on the web server 144 to crawl the web page to identify entities listed on the web page and generate an inventory of entities for the application. The data processing system 102 can consolidate the list of entities determine from the web page along with the entities associated with the application in the index 122. The data processing system 102 can update the index 122 to include entities obtained from parsing the web page.

By consolidating the responses to the queries from disparate data sources (e.g., different types of data sources with different types of data), the data processing system 102 can identify one or more applications that are configured to perform the action on the entity requested in the input audio signal. At 225, the data processing system 102 can select an application to perform the action on the entity. The data processing 102 can select one or more applications to suggest for performing the action on the entity. The data processing system 102 can select the application based on ranking the identified applications or scoring the identified applications. For example, the data processing system 102 can rank or score applications based on performance information, preference information, search engine 146 results, feedback, or other factors such as which applications are already installed on the computing device 104.

At 230, the data processing system can transmit an indication of the selected application to the computing device 104. In some cases, the data processing system 102 can transmit the indication including a command or instruction to cause the computing device to execute the application to perform the action on the entity (e.g., launch Application_A to play song titled "Song_A") at 235. In some cases, the data processing system 102 can transmit an indication including multiple suggest application that the computing device 104 can present to a user (e.g., via a display or audio interface), and then the use can select an application to launch or execute on the computing device 104 at 235.

In some cases, the indication can include a deep link to the entity within the application. Selecting the deep link can cause the application to launch and direct the application to open or execute the entity within the application.

Figure 3:
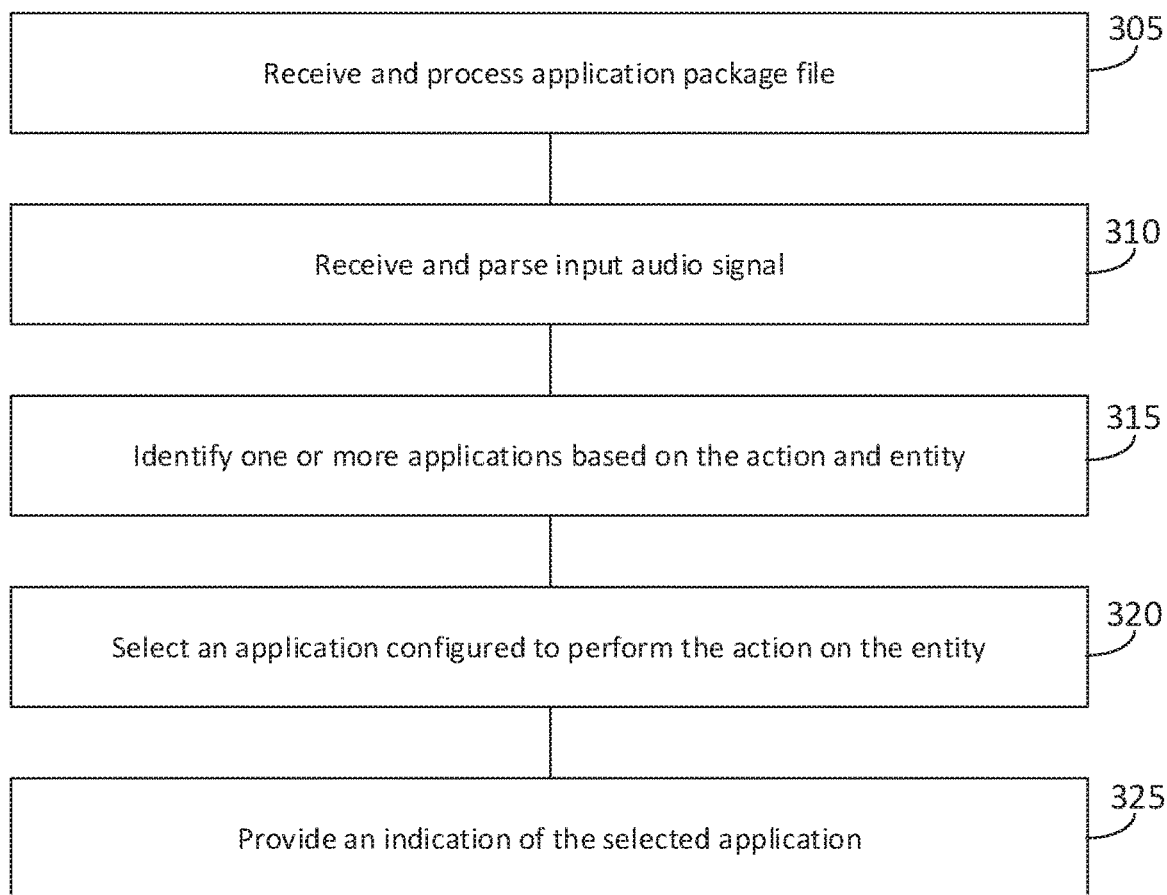
FIG. 3 is an illustration of a method of consolidating disparate data source queries, in accordance with an implementation.

FIG. 3 is an illustration of an example method for consolidating disparate data sources. The method 300 can be performed by one or more component, system or element of system 100, 200 or system 400. The method 300 can include receiving and processing application package files at 305. The data processing system can receive the application package files from a plurality of developer computing devices. The application package files can include instructions to distribute and install a plurality of applications on a plurality of computing devices. Each of the application package files can be associated with an action-inventory file. The data processing system can process the action-inventory file to identify one or more electronic actions the application performs and corresponding one or more entities on which the application performs the one or more electronic actions.

At 310, the data processing system can receive and parse an input audio signal. The data processing system can receive, via an interface of the data processing system, data packets corresponding to the input audio signal detected by a sensor of a client device. The data processing system can parse (e.g., via a natural language processing technique) the input audio signal to identify an action and an entity on which to perform the action.

At 315, the data processing system can identify one or more applications based on the action and entity. The data processing system can identify a first one or more applications configured to perform the action identified from the input audio signal. The data processing system can identify, based on the action-inventory file, a second one or more applications of the plurality of applications that can access the entity identified from the input audio signal. At 320, the data processing system can select, from the first one or more applications and the second one or more applications, an application configured to perform the action and access the entity identified from the input audio signal (e.g., based on a ranking or scoring process).

At 325, the data processing system can provide an indication of the selected application. The data processing system can provide, to the client device, an indication of the application selected by the data processing system to cause the client device to initiate execution of the application to perform the action using the entity identified in the input audio signal. The indication can include a deep link to the entity of the application to cause the client computing device to execute or launch the deep link to open the application directly to a view or portion of the application containing the entity.

Figure 4:
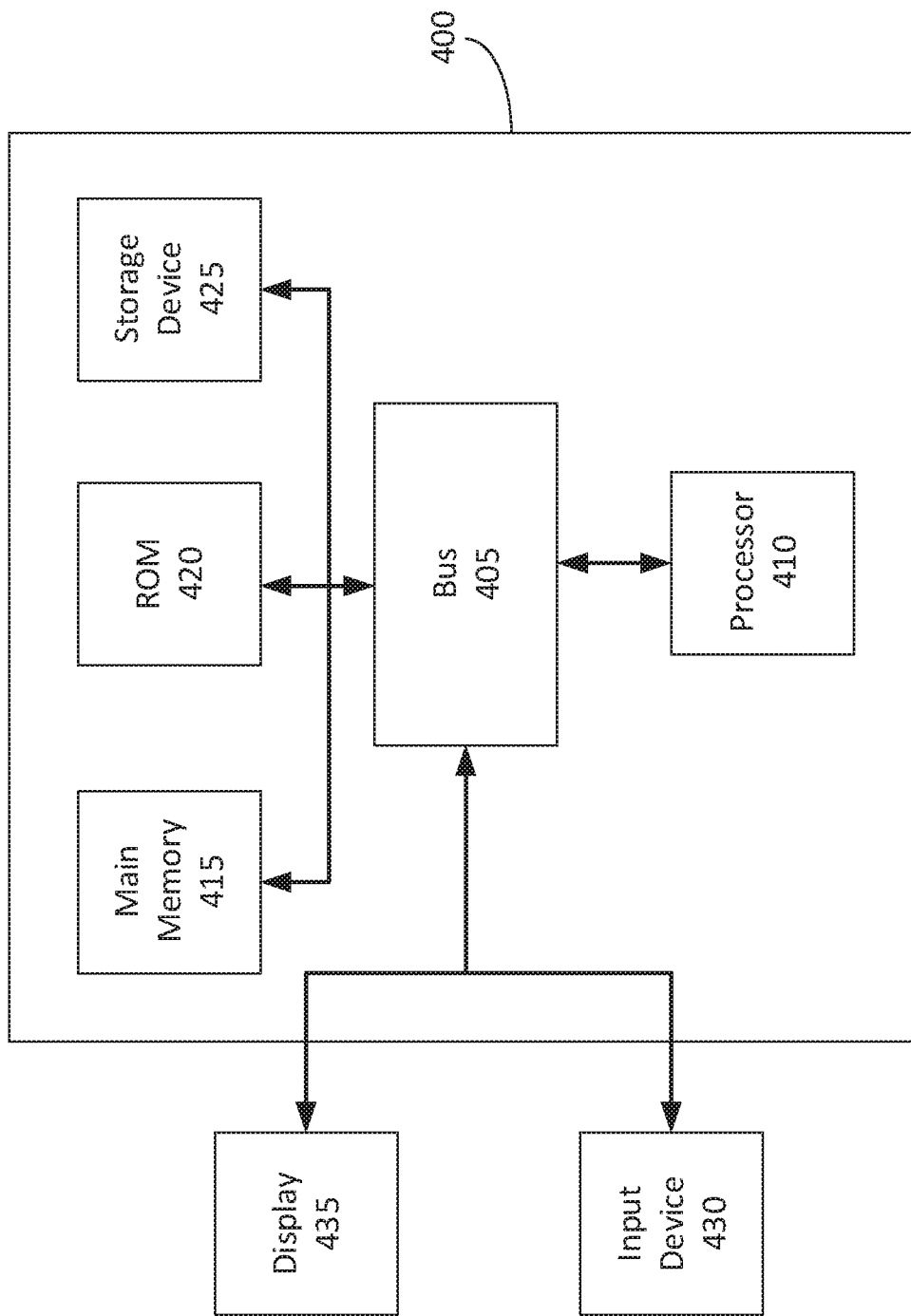
FIG. 4 is a block diagram illustrating a general architecture for a computer system that can be employed to implement elements of the systems depicted in FIG. 1 and FIG. 2, and the method depicted in FIG. 3.

FIG. 4 is a block diagram of an example computer system 400. The computer system or computing device 400 can include or be used to implement the system 100, or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 118. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 118.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The application intake component 114, application delivery component 116, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the developer computing device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the application delivery component 116, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to consolidate disparate data source queries, comprising:
    a data processing system comprising one or more processors and memory;
    an application intake component of the data processing system to:
        receive, from a plurality of developer computing devices, application package files, each application package file comprising instructions to distribute and install a respective application on a plurality of computing devices, each of the application package files associated with a respective action-inventory file;
        for each action-inventory file, process the action-inventory file to identify one or more electronic actions performed by the respective application of the application package file associated with the action-inventory file and corresponding one or more entities on which the respective application performs the one or more electronic actions;
    a natural language processor component of the data processing system to:
        receive, via an interface of the data processing system and a network, data packets comprising an input audio signal detected by a sensor of a client device;
        parse the input audio signal to identify an action and an entity on which to perform the action;

an application delivery component of the data processing system to:
  query a plurality of data sources to identify and select, based on the action-inventory file, one or more applications of the respective applications of the application package files associated with the action-inventory files, the one or more applications being configured with access to the entity identified from the input audio signal and configured to perform the action identified in the input audio signal; and
  provide, to the client device, an indication of the one or more applications selected by the data processing system to cause the client device to initiate execution of the one or more applications to perform the action using the entity identified in the input audio signal.

2. The system of claim 1, comprising:
the data processing system to receive the action-inventory files comprising an extensible markup language file.

3. The system of claim 1, comprising:
the data processing system to receive the action-inventory files comprising a pointer to a list of entities.

4. The system of claim 1, comprising the data processing system to:
  receive, for at least one of the plurality of applications, the action-inventory file comprising a uniform resource locator to a web page established via a developer computing device; and
  determine an inventory of entities from the web page of the developer computing device.

5. The system of claim 1, comprising the data processing system to:
  receive, for at least one of the plurality of applications, the action-inventory file comprising a uniform resource locator to a web page comprising a structured markup of entities;
  access the web page via the uniform resource locator;
  parse the web page with the structured markup of entities to identify an inventory of entities;
  associate, in a database, the inventory of entities with the at least one of the plurality of applications.

6. The system of claim 1, comprising the data processing system to:
  identify, from the input audio signal, an identified application of the one or more applications; and
  select the identified application based on the one or more applications and the input audio signal.

7. The system of claim 1, comprising the data processing system to:
  execute a web search via a search engine based on at least one of the action and the entity identified from the input audio signal; and
  identify at least one of the one or more applications based on results of the web search output by the search engine.

8. The system of claim 1, wherein querying the plurality of data sources to identify and select, based on the action-inventory files, the one or more applications comprises the data processing system to:
  execute a web search via a search engine based on at least one of the action and the entity identified from the input audio signal to identify the one or more applications;
  rank each of the one or more applications; and
  select a highest ranking application from the one or more applications as the application for which to provide the indication to the client device.

9. The system of claim 1, wherein querying the plurality of data sources to identify and select, based on the action-inventory files, the one or more applications comprises the data processing system to:
  execute a web search via a search engine based on at least one of the action and the entity identified from the input audio signal to identify the one or more applications;
  score each of the one or more applications based on performance feedback associated with the action; and
  select a highest scoring application from the one or more applications as the application for which to provide the indication to the client device.

10. The system of claim 1, wherein querying the plurality of data sources to identify and select, based on the action-inventory files, the one or more applications comprises the data processing system to:
  execute a web search via a search engine based on at least one of the action and the entity identified from the input audio signal to identify the one or more applications;
  score each of the one or more applications based on historical preference information associated with the client device for the action; and
  select a highest scoring application from the one or more applications as the application for which to provide the indication to the client device.

11. The system of claim 1, comprising:
the data processing system to identify the entity from the input audio signal based on a graph database comprising a hierarchical taxonomy of entities each having a unique identifier formed of a domain, type and property.

12. The system of claim 1, comprising the data processing system to:
  identify the entity from the input audio signal based on a graph database comprising a hierarchical taxonomy of entities each having a unique identifier formed of a domain, type and property; and
  identify the one or more applications based on a web search using the entity.

13. The system of claim 1, comprising:
  identify the entity from the input audio signal based on a graph database comprising a hierarchical taxonomy of entities each having a unique identifier formed of a domain, type and property;
  identify, via a database, a set of actions configured for the entity; and
  identify the one or more applications based on the set of actions configured for the entity.

14. A method of consolidating disparate data source queries, comprising:
  receiving, by a data processing system, from a plurality of developer computing devices, application package files, each application package file comprising instructions to distribute and install a respective plurality of applications on a plurality of computing devices, each of the application package files associated with a respective action-inventory file;
  for each action-inventory file, processing, by the data processing system, the action-inventory file to identify one or more electronic actions performed by the respective application of the application package file associated with the action-inventory file and corresponding one or more entities on which the respective application performs the one or more electronic actions;
  receiving, via an interface of the data processing system and a network, data packets comprising an input audio signal detected by a sensor of a client device;

parsing, by the data processing system, the input audio signal to identify an action and an entity on which to perform the action;

querying a plurality of data sources to identify and select, by the data processing system, based on the action-inventory files, one or more applications of the respective applications of the application package files associated with the action-inventory files, the one or more applications being configured with access to the entity identified from the input audio signal and configured to perform the action identified in the input audio signal; and providing, by the data processing system, to the client device, an indication of the one or more applications selected by the data processing system to cause the client device to initiate execution of the one or more applications to perform the action using the entity identified in the input audio signal.

15. The method of claim 14, comprising:

receiving, by the data processing system, the action-inventory file comprising an extensible markup language file.

16. The method of claim 14, comprising:

receiving, by the data processing system, the action-inventory file comprising a pointer to a list of entities.

17. The method of claim 14, comprising:

receiving, by the data processing system, for at least one of the plurality of applications, the action-inventory file comprising a uniform resource locator to a web page established via a developer computing device; and determining, by the data processing system, an inventory of entities from the web page of the developer computing device.

18. The method of claim 14, comprising:

receiving, by the data processing system, for at least one of the plurality of applications, the action-inventory file comprising a uniform resource locator to a web page comprising a structured markup of entities;

accessing, by the data processing system, the web page via the uniform resource locator;

parsing, by the data processing system, the web page with the structured markup of entities to identify an inventory of entities; and associating, by the data processing system, in a database, the inventory of entities with the at least one of the plurality of applications.

19. The method of claim 14, comprising the data processing system to:

identifying, from the input audio signal, the application; and selecting the application based on the one or more applications, the second one or more applications, and the input audio signal.

20. The method of claim 14, comprising:

executing a web search via a search engine based on at least one of the action and the entity identified from the input audio signal; and identifying at least one of the one or more applications based on results of the web search output by the search engine.

* * * * *